(12) United States Patent
Peczalski et al.

(10) Patent No.: US 8,813,575 B2
(45) Date of Patent: Aug. 26, 2014

(54) ULTRASONIC FLOW SENSOR AND METHOD

(75) Inventors: Andy Peczalski, Eden Prarie, MN (US); Brian Krafthefer, Stillwater, MN (US)

(73) Assignee: Honeywell International Inc., Morristown, NJ (US)

( * ) Notice: Subject to any disclaimer, the term of this patent is extended or adjusted under 35 U.S.C. 154(b) by 198 days.

(21) Appl. No.: 13/494,867

(22) Filed: Jun. 12, 2012

(65) Prior Publication Data

US 2013/0327156 A1   Dec. 12, 2013

(51) Int. Cl.
*G01F 1/66* (2006.01)

(52) U.S. Cl.
USPC ........................................ 73/861.27

(58) Field of Classification Search
CPC ............ G01F 1/66; G01F 1/662; G01F 1/667
USPC ......................... 73/861.26–861.29
See application file for complete search history.

(56) References Cited

U.S. PATENT DOCUMENTS

| 4,970,902 A | 11/1990 | Misumi et al. |
| 5,583,301 A | 12/1996 | Strauss et al. |
| 2014/0007698 A1* | 1/2014 | Peczalski et al. .......... 73/861.28 |

OTHER PUBLICATIONS

USPTO Office Action for U.S. Appl. No. 13/542,494 dated Mar. 4, 2014.

* cited by examiner

*Primary Examiner* — Jewel V Thompson
(74) *Attorney, Agent, or Firm* — Ingrassia Fisher & Lorenz, P.C.

(57) ABSTRACT

A flow sensor includes a conduit and an ultrasonic transceiver. The conduit has an inner surface and an outer surface. The inner surface defines a flow passage through which a fluid may flow in a flow direction. The ultrasonic transceiver is coupled to, and surrounds a portion of, the outer surface of the conduit. The ultrasonic transceiver is configured to transmit ultrasonic waves into the fluid that propagate in a direction that is parallel to the flow direction, receive ultrasonic waves, and supply sensor signals representative of the received ultrasonic waves.

20 Claims, 4 Drawing Sheets

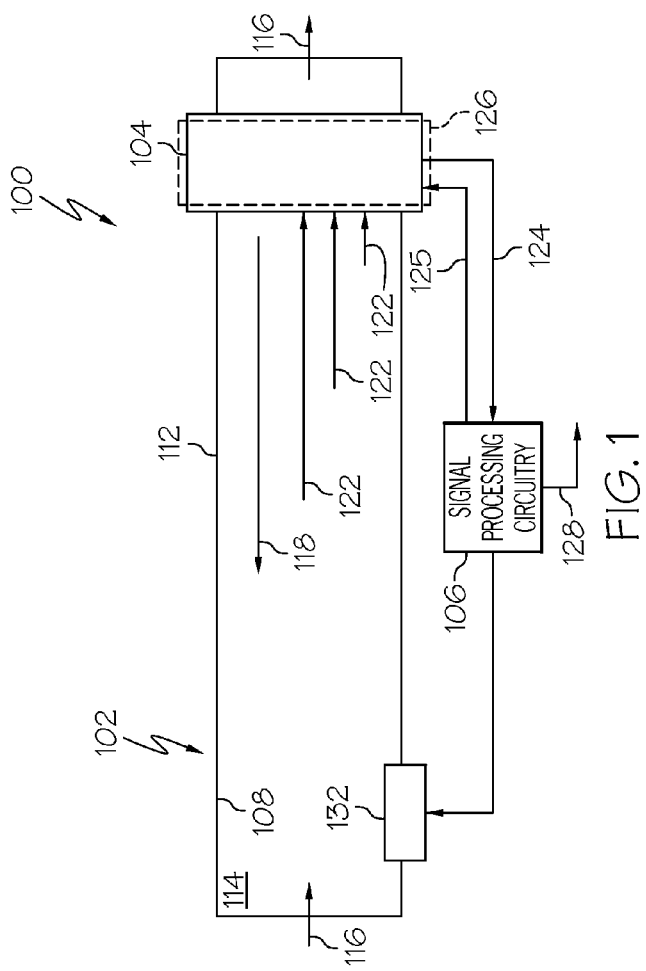
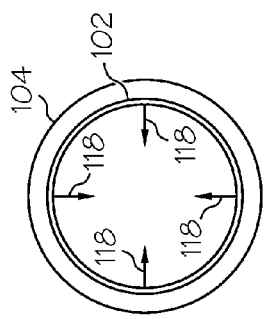

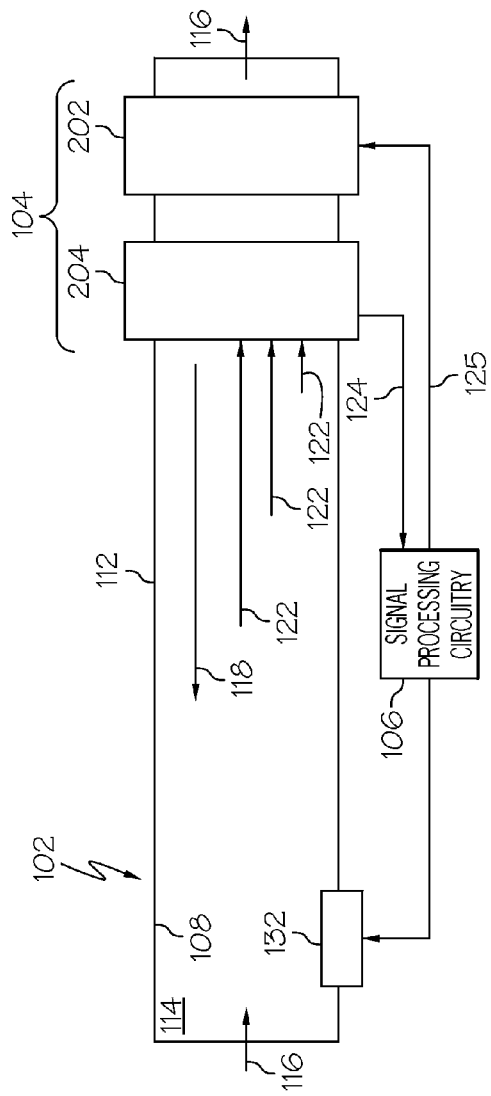
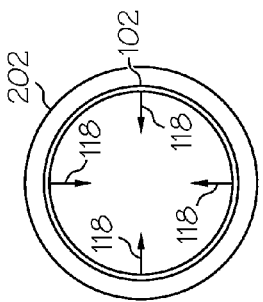

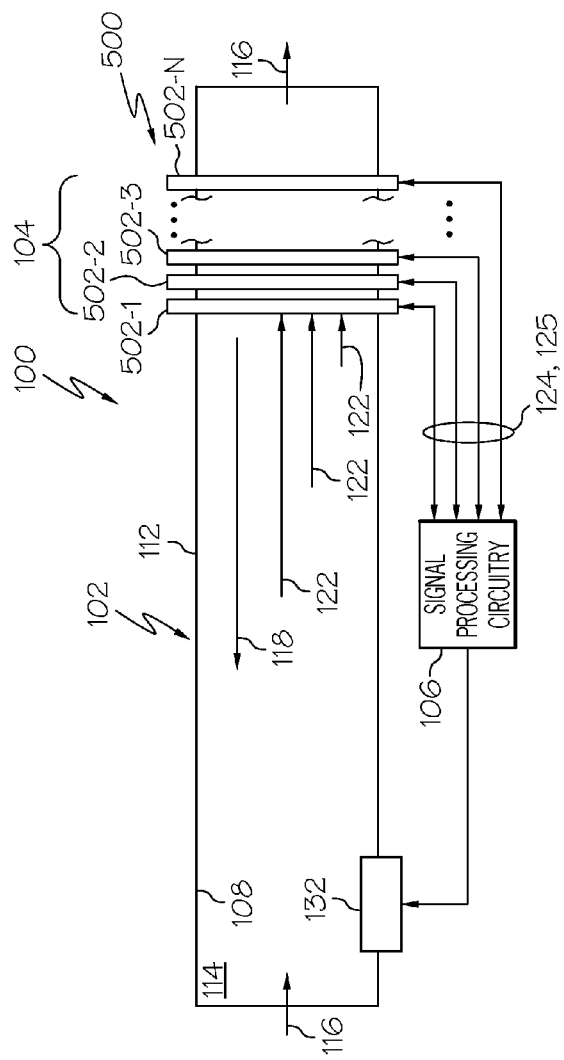
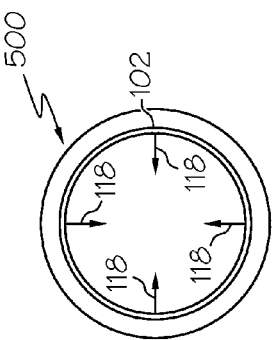

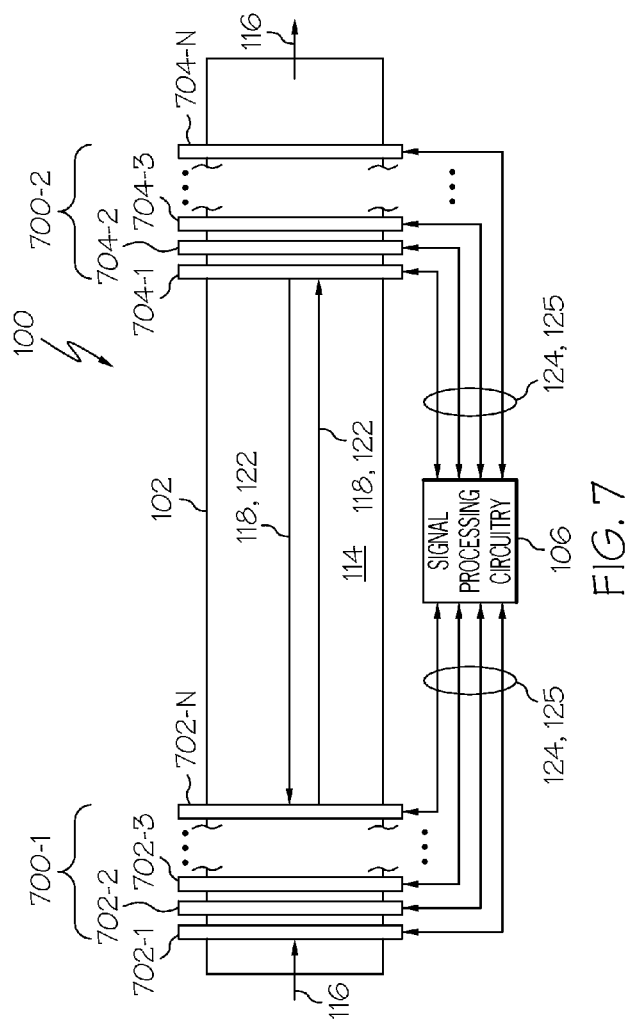
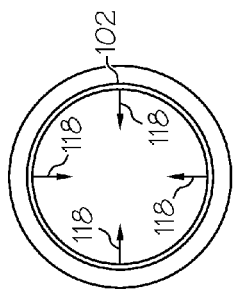

ULTRASONIC FLOW SENSOR AND METHOD

TECHNICAL FIELD

The present invention generally relates to flow sensors, and more particularly relates to an ultrasonic flow sensor and method for ultrasonically sensing flow.

BACKGROUND

Many systems include flow sensors for sensing the flow rate of a fluid in one or more system conduits. For example, many heating and air conditioning systems sense air flow for energy monitoring, systems that include burners sense natural gas flow, and numerous and varied manufacturing processes sense the flow rate of various fluids utilized in the process. Many flow sensors are invasive, which means the flow sensors rely on one or more elements that are physically disposed within the flow stream. Because of this, these sensors can be potentially costly to install, maintain, and replace. As may be appreciated, these costs could be significantly reduced if the flow sensor was non-invasive, meaning it could be installed without having to shut down the system or temporarily stop the flow of fluid.

One type of non-invasive flow sensor is an ultrasonic flow sensor. This type of flow sensor relies on the frequency shift (e.g., the Doppler Effect) of an ultrasonic wave when it is reflected by discontinuities in the flowing fluid. Specifically, ultrasonic waves are transmitted into a conduit in which a fluid is flowing, and the discontinuities in the flowing fluid reflect the ultrasonic wave with a slightly different frequency that is directly proportional to the rate of flow of the liquid.

Although ultrasonic flow sensors are non-invasive, these sensor types do exhibit certain drawbacks. For example, most are limited to relatively large diameter pipes and, as just noted, rely on discontinuities, such as suspended particles or gas bubbles, in the fluid. Presently known ultrasonic flow sensors are limited to fluids that flow relatively fast and have discontinuities of about 10 micron suspended therein. Presently known sensors can be relatively costly. Moreover, the fluid flow determination is influenced by the angle of the ultrasonic wave with respect to the flow vector. As a result, the accuracy of existing ultrasonic flow sensors can be impacted by the precision of the installation angle, the ultrasonic beam width, and changes in the inner surface of the pipe that can change direction of the ultrasonic beam.

Hence, there is a need for a non-invasive ultrasonic flow sensor that is not limited to relatively large diameter pipes and/or does not rely on discontinuities and/or relatively fast fluid flow rates and/or does not exhibit an accuracy that is impacted by the precision of the installation angle, the ultrasonic beam width, and changes in the inner surface of the pipe that can change direction of the ultrasonic beam. The present invention addresses one or more of these needs.

BRIEF SUMMARY

In one embodiment, a flow sensor includes a conduit and an ultrasonic transceiver. The conduit has an inner surface and an outer surface. The inner surface defines a flow passage through which a fluid may flow in a flow direction. The ultrasonic transceiver is coupled to, and surrounds a portion of, the outer surface of the conduit. The ultrasonic transceiver is configured to transmit ultrasonic waves into the fluid that propagate in a direction that is parallel to the flow direction, receive ultrasonic waves, and supply sensor signals representative of the received ultrasonic waves.

In another embodiment a flow sensor includes a conduit, a heater, an ultrasonic transceiver, and signal processing circuitry. The conduit has an inner surface and an outer surface, and the inner surface defines a flow passage through which a fluid may flow in a flow direction. The heater is coupled to the outer surface of the conduit upstream of the ultrasonic transceiver. The heater is adapted to be selectively energized and is configured, upon being energized, to heat the fluid flowing in the flow passage, and thereby generate a temperature gradient in the fluid. The ultrasonic transceiver is coupled to, and surrounds a portion of, the outer surface of the conduit. The ultrasonic transceiver is configured to transmit ultrasonic waves into the fluid that propagate in a direction that is parallel to the flow direction, receive ultrasonic waves reflected by the fluid, and supply sensor signals representative of the received ultrasonic waves. The signal processing circuitry is in operable communication with the ultrasonic transceiver and is configured to supply excitation signals to the ultrasonic transceiver to cause the ultrasonic transceiver to transmit the ultrasonic waves, receive the sensor signals supplied by the ultrasonic transceiver, and generate a flow signal representative of fluid flow in the flow passage.

In yet another embodiment, a flow sensor includes a conduit, a plurality of first ultrasonic transducers, a plurality of second ultrasonic transducers, and signal processing circuitry. The conduit has an inner surface and an outer surface, and the inner surface defines a flow passage through which a fluid may flow in a flow direction. Each of the first ultrasonic transducers is configured to transmit ultrasonic waves into the fluid in a first direction that is parallel to the flow direction, receive ultrasonic waves, and supply first sensor signals representative of the received ultrasonic waves. The second ultrasonic transducers are disposed upstream of the first ultrasonic transducers. Each of the second ultrasonic transducers is configured to transmit ultrasonic waves into the fluid in a second direction that is parallel to the flow direction, receive ultrasonic waves, and supply second sensor signals representative of the received ultrasonic waves, the second direction opposite to the first direction. The signal processing circuitry is in operable communication with each of the first and second ultrasonic transducers. The signal processing circuitry is configured to supply excitation signals to the first and second ultrasonic transducers to cause first and second ultrasonic transducers to transmit the ultrasonic waves, receive the first and second sensor signals supplied by the first and second ultrasonic transducers, and generate a flow signal representative of fluid flow in the flow passage.

Furthermore, other desirable features and characteristics of the ultrasonic flow sensor will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein:

FIGS. 1 and 2 depict simplified side and end views, respectively, of one embodiment of an ultrasonic flow sensor;

FIGS. 3 and 4 depict simplified side and end views, respectively, of another embodiment of an ultrasonic flow sensor;

FIGS. 5 and 6 depict simplified side and end views, respectively, of yet another embodiment of an ultrasonic flow sensor; and FIGS. 7 and 8 depict simplified side and end views, respectively, of yet embodiment of an ultrasonic flow sensor.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Referring now to FIGS. 1 and 2, simplified side and end views, respectively, of one embodiment of an ultrasonic flow sensor 100 are depicted. The flow sensor 100 includes a conduit 102, an ultrasonic transceiver 104, and signal processing circuitry 106. The conduit 102 includes an inner surface 108 and an outer surface 112. The inner surface 108 defines a flow passage 114 through which a fluid may flow in a flow direction 116.

The ultrasonic transceiver 104 is coupled to the outer surface 112 of the conduit 102. Moreover, as is depicted most clearly in FIG. 2, the ultrasonic transducer 104 surrounds a portion of the outer surface 112 of the conduit 102. Because the ultrasonic transducer 104 is coupled to and surrounds a portion of the outer surface of the conduit, it will, upon receipt of suitable excitation signals, transmit ultrasonic waves 118 into the fluid that propagate in a direction that is parallel to the flow direction 116 and that encompass the entire flow front of the fluid. As a result, the flow sensor 100 is insensitive to the angle between the transmitted ultrasonic waves 118 and the flow direction 116, and to the interface between the fluid and the inner surface 108 of the conduit 112 that may change the angle of the ultrasonic waves 118 during passage. As FIG. 1 further depicts, the ultrasonic transducer 104 also receives ultrasonic waves 122 reflected by the fluid. The ultrasonic transducer 104 is additionally configured to supply sensor signals 124 representative of the received ultrasonic waves to the signal processing circuitry 106.

Although the ultrasonic transceiver 104 may be variously implemented, in the depicted embodiment, it is implemented using a thin film polymer piezoelectric, such as PVDF (polyvinylidene fluoride), that is formed in the shape of a band. This band of PVDF may be cut to fit many different size conduits, including those having diameters of less than 1 inch. In a particular preferred embodiment, the ultrasonic transceiver 104 is installed by first applying ultrasonic grease or glue (not illustrated) to the outer surface 112 of the conduit 102. The band of PVDF, which is cut to the appropriate length is then wrapped around and secured to the conduit 102. In some embodiments, a clamp 126, which is depicted in phantom in FIG. 2, may also be disposed around and engage the thin film polymer piezoelectric band.

The signal processing circuitry 106 is in operable communication with the ultrasonic transceiver 104, and is configured to supply the excitation signals 125 thereto that cause the ultrasonic transceiver 104 to transmit the ultrasonic waves 118. The signal processing circuitry 106 also receives the sensor signals 124 supplied by the ultrasonic transceiver 104 and, using generally well-known techniques, generates a flow signal 128 representative of fluid flow in the flow passage 114. It will be appreciated that the signal processing circuitry 106 may be in operable communication with the ultrasonic transceiver 104 via either a wired or wireless connection.

The flow sensor 100 depicted in FIGS. 1 and 2 additionally includes a heater 132. The heater 132 is coupled to the outer surface 112 of the conduit 102, upstream of the ultrasonic transceiver 104. The heater 132 is selectively energized, preferably, as shown, via the signal processing circuitry 106, and is configured, upon being energized, to heat the fluid flowing in the flow passage 114. More specifically, the heater 132 is controllably energized to quickly heat portion of the conduit 102 to which the heater 132 is coupled. This generates a temperature gradient, and thus a density gradient, in the flowing fluid, thereby providing a moving reflective target for the transmitted ultrasonic waves 118. Thus, the depicted flow sensor 100, while configured as Doppler Effect type of sensor, will sense the flow of fluids that have no discontinuities, such as particles or entrained bubbles, disposed therein.

In the embodiment depicted in FIGS. 1 and 2, the ultrasonic transceiver 104 is implemented as a single device. It will be appreciated, however, that this is merely exemplary of one embodiment, and that the ultrasonic transceiver 104 could be variously implemented. For example, as depicted in FIGS. 3 and 4, the ultrasonic transceiver 104 could also be implemented using separate devices. That is, it could be implemented using an ultrasonic transmitter 202 and a separate ultrasonic receiver 204. As may be readily understood, the ultrasonic transmitter 202 and receiver 204 are both coupled to, and surround a portion of, the outer surface 112 of the conduit 102. However, the ultrasonic receiver 204 is separated from, and is disposed upstream from, the ultrasonic transmitter 204. The ultrasonic transmitter 202 is configured, upon receipt of excitation signals 125 from the signal processing circuitry 106, to transmit ultrasonic waves 118 into the fluid that propagate in a direction that is parallel to the flow direction 116. The ultrasonic receiver 204 is configured to receive ultrasonic waves 122 reflected by the fluid, and supply sensor signals 124 representative of the received ultrasonic waves to the signal processing circuitry 106.

With reference now to FIGS. 5 and 6, in yet another embodiment the ultrasonic transceiver 104 may be implemented as an ultrasonic transducer array 500. In particular, the depicted ultrasonic transceiver 104 is implemented using a plurality of ultrasonic transducers 502 (e.g., 502-1, 502-2, 502-3, . . . 502-N), each of which is coupled to, and surrounds a portion of, the outer surface 112 of the conduit 102. Each of the ultrasonic transducers 502 are configured to transmit ultrasonic waves 118 into the fluid that propagate in a direction that is parallel to the flow direction 116, and to receive reflected ultrasonic waves 122 and supply sensor signals 124 representative of the received ultrasonic waves to the signal processing circuitry 106.

It is noted that the ultrasonic transducer array 500 is preferably controlled to implement a phased-array ultrasonic transceiver. To do so, the signal processing circuit 106 depicted in FIG. 5 is configured to supply separate excitation signals of differing phases and frequencies to each of the ultrasonic transducers 502. This in turn causes each of the ultrasonic transducers 502 to transmit ultrasonic waves 118 of different phases. As may be readily appreciated, the phases of the excitation signals supplied to the ultrasonic transducers 502 can be controlled to generate ultrasonic waves 118 at a desired angle, width, and energy distribution across the wavefront. Preferably, the phases of the excitation signals are controlled such that the ultrasonic transducers 502 generate ultrasonic waves 118 that propagate in a direction that is parallel to the flow direction 116 and that uniformly encompass the entire flow front of the fluid.

As with the previous embodiments, the flow sensor 100 depicted in FIGS. 5 and 6 also includes the heater 132 to controllably and quickly heat the portion of the conduit 102 to which the heater 132 is coupled, and thereby provide a moving reflective target for the transmitted ultrasonic waves 118. And the signal processing circuitry 106 is additionally configured to receive the sensor signals supplied by each of the ultrasonic transducers 502, and generate a flow signal representative of fluid flow in the flow passage 114.

The embodiments depicted in FIGS. 1-6 were each configured as Doppler Effect type of flow sensors. However, the embodiment depicted in FIGS. 7 and 8 is configured as a time-of-flight type of flow sensor. The flow sensor 100 may be implemented as a time-of-flight type sensor if, for example, strong thermal gradient reflections cannot be generated in the fluid. No matter the reason for implementing the time-of-flight type flow sensor, it is seen that the flow sensor 100 includes two ultrasonic transducer arrays 700-1, 700-2. The first ultrasonic transducer array 700-1 is implemented using a plurality of first ultrasonic transducers 702 (e.g., 702-1, 702-2, 702-3, . . . 702-N). The second ultrasonic transducer array 700-2, which is disposed upstream of the first ultrasonic transducer array 700-1, is implemented using a plurality of second ultrasonic transducers 704 (e.g., 704-1, 704-2, 704-3, . . . 704-N).

The first and second ultrasonic transducers 702, 704 are each coupled to, and surround a portion of, the outer surface 112 of the conduit 102. Each of the first and second ultrasonic transducers 702, 704 are also configured to transmit ultrasonic waves 118 into the fluid that propagate in a direction that is parallel to the flow direction 116, and to receive reflected ultrasonic waves 122 and supply first and second sensor signals 124 representative of the received ultrasonic waves to the signal processing circuitry 106. However, the first ultrasonic transducers 702 transmit ultrasonic waves 118 that propagate in a first direction, and the second ultrasonic transducers transmit ultrasonic waves 118 that propagate in a second direction that is opposite to that of the first direction.

Similar to the embodiment depicted in FIGS. 5 and 6, the first and second ultrasonic transducer arrays 700-1, 700-2 are each is preferably controlled to implement phased-array ultrasonic transceivers. Thus, the signal processing circuit 106 depicted in FIG. 7 is configured to supply separate excitation signals of differing phases and frequencies to each of the first and second ultrasonic transducers 702, 704. This in turn causes each of the ultrasonic transducers 702, 704 to transmit ultrasonic waves 118 of different phases. Again, however, the phases of the excitation signals supplied to the first and second ultrasonic transducers 702, 704 are preferably controlled such that the first and second ultrasonic transducers 702, 704 generate ultrasonic waves 118 that propagate in first and second directions, respectively, that are parallel to the flow direction 116 and that encompass the entire flow front of the fluid with a desirable distribution of the energy across the wavefront. An example of a desirable energy distribution is one that has the same shape as the velocity of the fluid flow i.e., is highest in the center and diminishing toward the inner surface 108 of the conduit 102.

The signal processing circuitry 106, in addition to controllably supplying excitation signals to the first and second ultrasonic transducers 702, 704, is coupled to receive the first and second sensor signals 124 supplied by the first and second ultrasonic transducers 702, 704, and generates, using well-known techniques, a flow signal representative of fluid flow in the flow passage.

In each of the embodiments depicted and described herein, operating the flow sensor 100 at the resonant frequency of the fluid inside the conduit will increase the sensitivity of the flow sensor 100. However, the Doppler Effect type flow sensor 100 should be operated at frequencies of about 1 MHz and that are 10-100 times larger than the resonant frequency of the conduit to make the ultrasound wave as short as possible to detect the smallest particles present in the liquid. For the embodiment depicted in FIGS. 5 and 6, the phase and frequency of the excitation signals could be automatically adjusted to obtain the largest Doppler response signal, and thereby provide self-calibration. The optimum settings may vary with the conduit materials, dimensions, and fluid type.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal In the alternative, the processor and the storage medium may reside as discrete components in a user terminal In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A flow sensor, comprising:
   a conduit having an inner surface and an outer surface, the inner surface defining a flow passage through which a fluid may flow in a flow direction; and
   an ultrasonic transceiver coupled to, and surrounding a portion of, the outer surface of the conduit, the ultrasonic transceiver configured to (i) transmit ultrasonic waves into the fluid that propagate in a direction that is parallel to the flow direction, (ii) receive ultrasonic waves, and (iii) supply sensor signals representative of the received ultrasonic waves.

2. The flow sensor of claim 1, further comprising:
   signal processing circuitry in operable communication with the ultrasonic transceiver, the signal processing circuitry configured to:
     supply excitation signals to the ultrasonic transceiver to cause the ultrasonic transceiver to transmit the ultrasonic waves,
     receive the sensor signals supplied by the ultrasonic transceiver, and
     generate a flow signal representative of fluid flow in the flow passage.

3. The flow sensor of claim 1, further comprising:
   a heater coupled to the outer surface of the conduit upstream of the ultrasonic transceiver, the heater adapted to be selectively energized and configured, upon being energized, to heat the fluid flowing in the flow passage, and thereby generate a temperature gradient in the fluid.

4. The flow sensor of claim 1, wherein the ultrasonic transceiver comprises:
   an ultrasonic transmitter configured to transmit ultrasonic waves into the fluid; and
   an ultrasonic receiver separated from the ultrasonic transmitter for receiving ultrasonic waves and supplying signals representative thereof.

5. The flow sensor of claim 1, wherein the ultrasonic transceiver comprises a thin film polymer piezoelectric band.

6. The flow sensor of claim 5, further comprising a clamp disposed around and engaging the thin film polymer piezoelectric band.

7. The flow sensor of claim 5, further comprising glue disposed between the thin film polymer piezoelectric band and the conduit.

8. The flow sensor of claim 1, wherein the ultrasonic transceiver comprises a plurality of first ultrasonic transducers, each of the first ultrasonic transducers configured to (i) transmit ultrasonic waves into the fluid in a first direction that is parallel to the flow direction, (ii) receive ultrasonic waves, and (iii) supply first sensor signals representative of the received ultrasonic waves.

9. The flow sensor of claim 8, further comprising:
   signal processing circuitry in operable communication with each of the first ultrasonic transducers, the signal processing circuitry configured to:
     supply separate excitation signals to each of the first ultrasonic transducers to cause each of the first ultrasonic transducers to transmit ultrasonic waves, each of the excitation signals having a different phase,
     receive the sensor signals supplied by each of the first ultrasonic transducers, and
     generate a flow signal representative of fluid flow in the flow passage.

10. The flow sensor of claim 8, further comprising:
    a plurality of second ultrasonic transducers disposed upstream of the first ultrasonic transducers, each of the second ultrasonic transducers configured to (i) transmit ultrasonic waves into the fluid in a second direction that is parallel to the flow direction, (ii) receive ultrasonic waves, and (iii) supply second sensor signals representative of the received ultrasonic waves, the second direction opposite to the first direction.

11. The flow sensor of claim 10, further comprising:
    signal processing circuitry in operable communication with the first and second ultrasonic transducers, the signal processing circuitry configured to:
      supply excitation signals to the first and second ultrasonic transducers to cause first and second ultrasonic transducers to transmit the ultrasonic waves,
      receive the first and second sensor signals supplied by the first and second ultrasonic transducers, and
      generate a flow signal representative of fluid flow in the flow passage.

12. A flow sensor, comprising:
    a conduit having an inner surface and an outer surface, the inner surface defining a flow passage through which a fluid may flow in a flow direction;
    a heater coupled to the outer surface of the conduit upstream of the ultrasonic transceiver, the heater adapted to be selectively energized and configured, upon being energized, to heat the fluid flowing in the flow passage, and thereby generate a temperature gradient in the fluid;

an ultrasonic transceiver coupled to, and surrounding a portion of, the outer surface of the conduit, the ultrasonic transceiver configured to (i) transmit ultrasonic waves into the fluid that propagate in a direction that is parallel to the flow direction, (ii) receive ultrasonic waves reflected by the fluid, and (iii) supply sensor signals representative of the received ultrasonic waves; and signal processing circuitry in operable communication with the ultrasonic transceiver, the signal processing circuitry configured to:

supply excitation signals to the ultrasonic transceiver to cause the ultrasonic transceiver to transmit the ultrasonic waves, receive the sensor signals supplied by the ultrasonic transceiver, and generate a flow signal representative of fluid flow in the flow passage.

13. The flow sensor of claim 12, wherein the ultrasonic transceiver comprises:

an ultrasonic transmitter configured to transmit ultrasonic waves into the fluid; and an ultrasonic receiver separated from the ultrasonic transmitter for receiving ultrasonic waves and supplying signals representative thereof.

14. The flow sensor of claim 12, wherein the ultrasonic transceiver comprises a thin film polymer piezoelectric band.

15. The flow sensor of claim 14, further comprising a clamp disposed around and engaging the thin film polymer piezoelectric band.

16. The flow sensor of claim 14, further comprising glue disposed between the thin film polymer piezoelectric band and the conduit.

17. A flow sensor, comprising:

a conduit having an inner surface and an outer surface, the inner surface defining a flow passage through which a fluid may flow in a flow direction;

a plurality of first ultrasonic transducers, each of the first ultrasonic transducers configured to (i) transmit ultrasonic waves into the fluid in a first direction that is parallel to the flow direction, (ii) receive ultrasonic waves, and (iii) supply first sensor signals representative of the received ultrasonic waves;

a plurality of second ultrasonic transducers disposed upstream of the first ultrasonic transducers, each of the second ultrasonic transducers configured to (i) transmit ultrasonic waves into the fluid in a second direction that is parallel to the flow direction, (ii) receive ultrasonic waves, and (iii) supply second sensor signals representative of the received ultrasonic waves, the second direction opposite to the first direction; and signal processing circuitry in operable communication with each of the first and second ultrasonic transducers, the signal processing circuitry configured to:

supply excitation signals to the first and second ultrasonic transducers to cause first and second ultrasonic transducers to transmit the ultrasonic waves, receive the first and second sensor signals supplied by the first and second ultrasonic transducers, and generate a flow signal representative of fluid flow in the flow passage.

18. The flow sensor of claim 17, wherein each of the first and second ultrasonic transducers comprises a thin film polymer piezoelectric band.

19. The flow sensor of claim 18, further comprising a plurality of clamps, each clamp disposed around and engaging a different thin film polymer piezoelectric band.

20. The flow sensor of claim 18, further comprising glue disposed between each thin film polymer piezoelectric band and the conduit.

* * * * *